(12) United States Patent
Aharoni et al.

(10) Patent No.: US 11,932,417 B2
(45) Date of Patent: Mar. 19, 2024

(54) AUTONOMOUS UAV PACKAGE DELIVERY SYSTEM

(71) Applicant: STRIX DRONES LTD, Neve Yarak (IL)

(72) Inventors: Niv Aharoni, Neve Yarak (IL); Maoz Klein, Tel Aviv (IL)

( * ) Notice: Subject to any disclaimer, the term of this patent is extended or adjusted under 35 U.S.C. 154(b) by 36 days.

(21) Appl. No.: 17/720,320

(22) Filed: Apr. 14, 2022

(65) Prior Publication Data

US 2023/0331399 A1 Oct. 19, 2023

(51) Int. Cl.
*B64F 1/32* (2006.01)
*B65G 65/00* (2006.01)
*B64U 101/60* (2023.01)

(52) U.S. Cl.
CPC ............... *B64F 1/32* (2013.01); *B65G 65/00* (2013.01); *B64U 2101/60* (2023.01); *B65G 2814/0301* (2013.01)

(58) Field of Classification Search
CPC ... B64F 1/32; B65G 65/00; B65G 2814/0301; B65G 1/0478; B65G 1/04; B65G 67/06; B64U 2101/60; B64U 2101/66
See application file for complete search history.

(56) References Cited

U.S. PATENT DOCUMENTS

| 4,634,333 | A | * | 1/1987 | Butterly, Jr. | B65G 65/00 414/400 |
| 5,927,927 | A | * | 7/1999 | Anderson | B65G 65/00 414/400 |
| 2017/0175413 | A1 | * | 6/2017 | Curlander | B64F 1/32 |
| 2021/0284450 | A1 | * | 9/2021 | Wang | B64F 1/005 |
| 2021/0309363 | A1 | * | 10/2021 | Zhou | B64C 39/024 |
| 2021/0394930 | A1 | * | 12/2021 | O'Toole | B60L 53/80 |

* cited by examiner

*Primary Examiner* — Glenn F Myers

(57) ABSTRACT

A system for receiving a package from an unmanned aerial vehicle that includes a landing pad comprises a flat platform with a central hole, an elevating subsystem comprises a lifting board and a lifting mechanism, and a compartments subsystem comprises plurality of compartments, one above the other, each of which has a pushing rod with an actuator. The flat platform is suitable for the aerial vehicle to land on it. The lifting board is positioned in the central hole in such a way that the lifting board can be leveled with the flat platform when the aerial vehicle is landing, and the lifting board is suitable to the aerial vehicle to place the package on it. The lifting mechanism can lift up and lower down the lifting board that can stop in front of each compartment and the pushing rod can push the package to the compartment.

2 Claims, 2 Drawing Sheets

AUTONOMOUS UAV PACKAGE DELIVERY SYSTEM

TECHNICAL FIELD

The present invention relates to a system for loading or receiving a package from unmanned aerial vehicle.

PRIOR ART

The use of unmanned aerial vehicles is increasing and requires innovations and solutions for loading and receiving packages from unmanned aerial vehicles. The present invention discloses a good and efficient solution for these needs.

THE INVENTION

Figure 1:
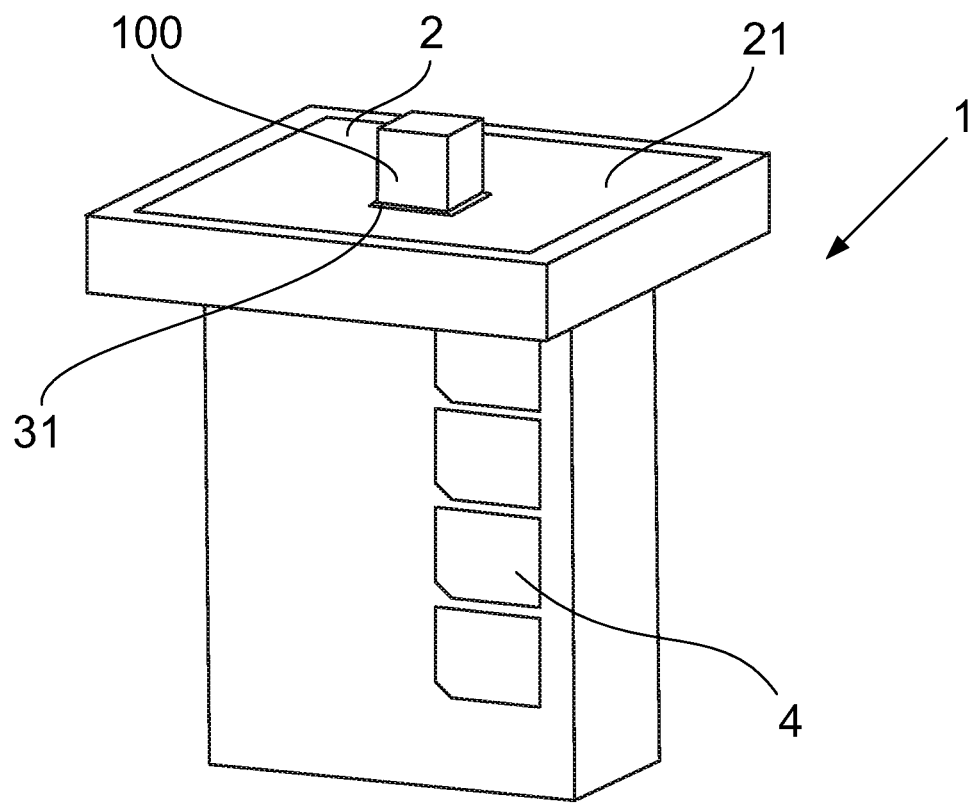
FIG. 1 depicts schematically the system (1).

The main objective of the present invention is to provide a system (1) for loading or receiving a package (100) from unmanned aerial vehicle (200). The system for receiving the package (1) includes:

A landing pad (2) that comprise a flat platform (21) with a central hole (22) at the center (23), or about the center, of the flat platform. It is preferably that the flat platform will be made of materials and size as it is customary to design landing platforms for unmanned aerial vehicles. The purpose is to enable the unmanned aerial vehicle to land on the flat platform and take off from it safely and effectively.

An elevating subsystems (3) comprises a lifting board (31) and a lifting mechanism (32). The lifting mechanism (32) can be of any known type that can be used for lifting and lowering an elevator, and in this case, lifting and lowering the lifting board (31) that serves as an elevator. It is preferably that the lifting mechanism (32) will includes a guide rail (321), a guiding pulley (322) that fits the guide rail, a lifting cable (323) and a motor (324) for pulling up and loosing down the lifting cable on which the lifting board is hanged. The guide rail is fixed to the compartment subsystem (4), the guiding pulley is fixed to the lifting floor, and when they are assembled they define the track of the lifting board and also may control its speed and stopping pints.

A compartments subsystem (4) comprises plurality of compartments (41), one above the other, each of which has a pushing rod (42) that is equipped with an actuator (43). The compartments subsystem (4) includes plurality of compartments (41) into which the packages are transferred as needed. The lifting board can go down and stop in front of each compartment. The lifting board can stop in front of each compartment according to known mechanisms under which elevators stop at each floor of a building, for example, using sensors. The pushing rod may be a telescopic rod that is operated by the actuator and can move and push the package from the lifting board to the compartment.

The flat platform (21) of the landing pad (2) is designed to be suitable for the unmanned aerial vehicle (200) to land on it. The lifting board (31) is designed to be positioned horizontally in the central hole (22) of the flat platform, in such a way that it can be leveled with the flat platform (21) when the unmanned aerial vehicle (200) is landing on the landing pad (2). The lifting board (31) is suitable to receive the package (100) in a way that the unmanned aerial vehicle (200) can place the package on the lifting board.

After the vehicle (200) lands on the landing pad (2) and places the package (100) on the lifting board (31), the lifting mechanism (32) goes into action and lowers the lifting board downwards and stops it in front of the compartment intended to receive the package. As explained before, the lifting mechanism (32) is designed to lift up and lower down the lifting board (31).

The lifting board (31) is designed to stop in front of each compartment (41) according to need and the pushing rod (42) is designed to push the package from the lifting board to that compartment. The system may be designed for loading packages to the unmanned aerial vehicle or may be combined with the ability to load and receive packages. In these cases, the system may include a loading compartment (410), that can be one of the compartments (41) or a compartment specially designed for loading packages on the unmanned aerial vehicle. The loading compartment (410) includes a pushing loading rod (420) with a loading actuator (430) that pushes a package from the loading compartment to the lifting board so that the lifting board can lift the package up directly to the unmanned aerial vehicle for being loaded.

Figure 2:
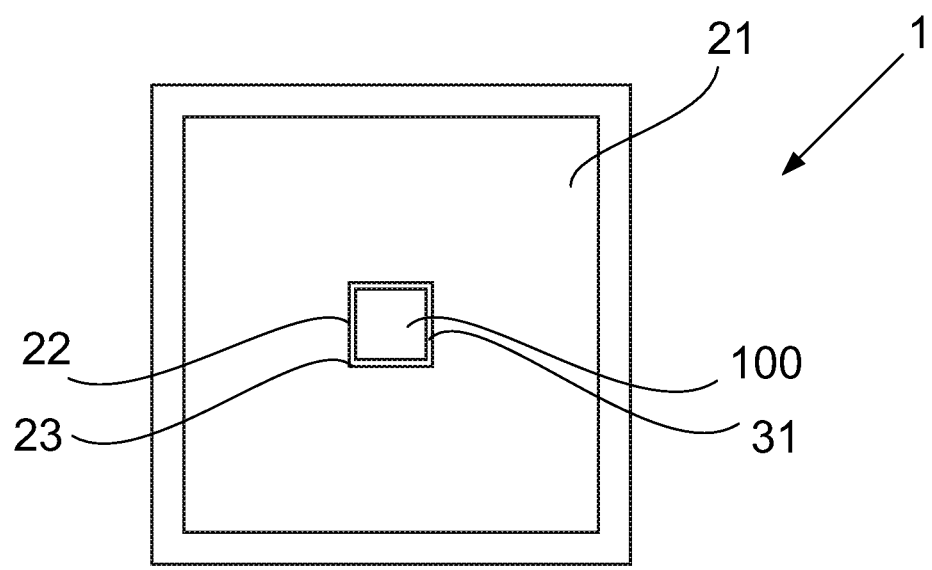
FIG. 2 depicts the landing pad (2).
Figure 3:
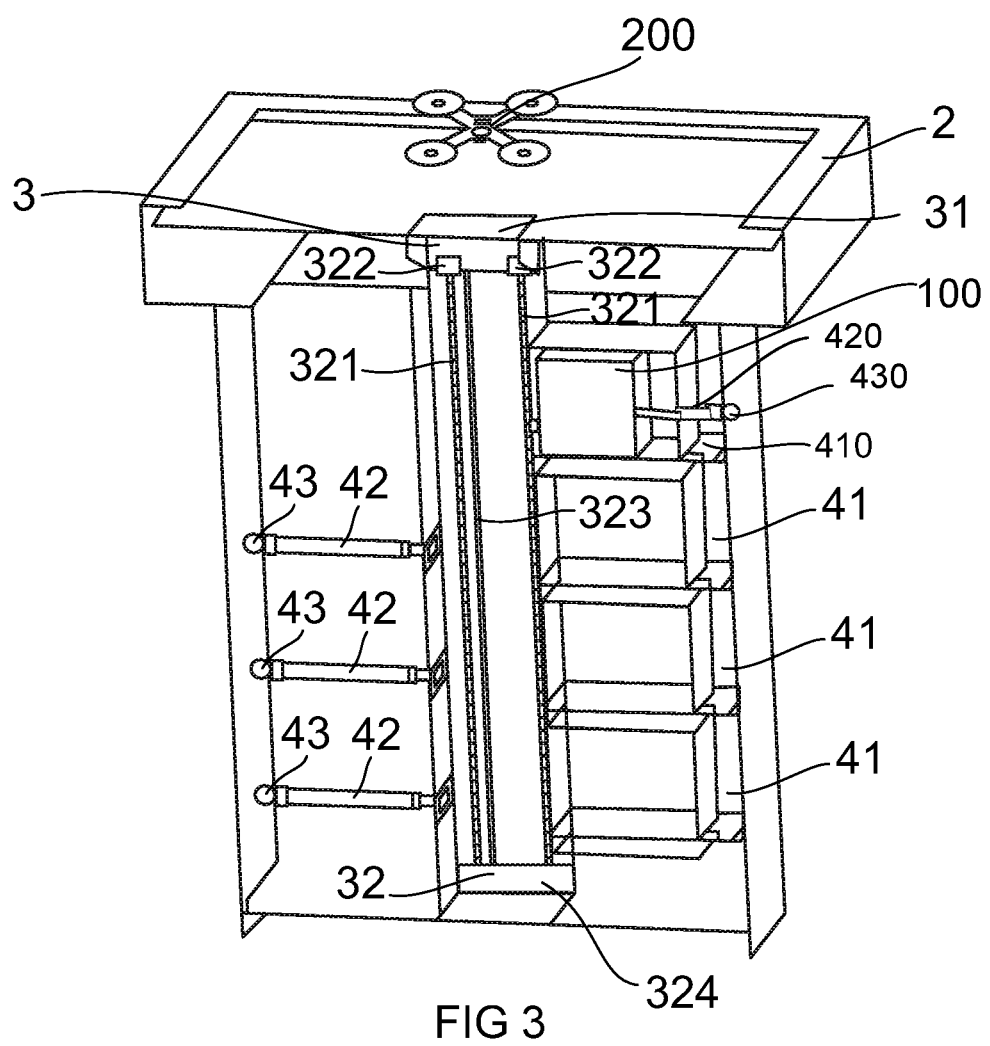
FIG. 3 is a cross-sectional depiction of the system (1).

FIG. 1 depicts schematically the system (1), FIG. 2 depicts the landing pad (2), and FIG. 3 is a cross-sectional depiction of the system (1).

What is claimed is:

1. A system for receiving a package from an unmanned aerial vehicle, comprising:
   (a) a landing pad that comprises a flat platform having a central hole,
   (b) an elevating subsystem that comprises a flat lifting board and a lifting mechanism that is designed to lift up and lower down the flat lifting board, and
   (c) a compartments subsystem that comprises a plurality of compartments, one above the other, each of which has a pushing rod that is equipped with an actuator;
   wherein the flat lifting board is designed to be positioned horizontally in the central hole and to be leveled with the flat platform when the unmanned aerial vehicle is landing on the landing pad, and wherein the flat platform together with the flat lifting board when leveled with the flat platform are designed to be used as a landing surface of the unmanned aerial vehicle;
   wherein the flat lifting board is suitable to the unmanned aerial vehicle to place the package on the flat lifting board;
   wherein the flat lifting board is designed to stop in front of each compartment, and
   wherein each pushing rod is designed to push the package from the lifting board to each respective compartment.

2. A system for loading a package on an unmanned aerial vehicle, comprising:
   (a) a landing pad that comprises a flat platform having a central hole,
   (b) an elevating subsystem that comprises a flat lifting board and a lifting mechanism that is designed to lift up and lower down the flat lifting board, and
   (c) a loading compartments and a pushing loading rod that is equipped with a loading actuator;
   wherein the flat lifting board is designed to be positioned horizontally in the central hole and to be leveled with the flat platform when the unmanned aerial vehicle is landing on the landing pad and wherein the flat platform together with the flat lifting board when leveled with the flat platform are designed to be used as a landing surface of the unmanned aerial vehicle;

wherein the flat lifting board is designed to stop in front of the loading compartment, wherein the loading pushing rod is designed to push the package from the loading compartment to the flat lifting board, and wherein the flat lifting board is suitable to receive the package from the loading compartment and direct it up to the unmanned aerial vehicle for being loaded.

* * * * *